United States Patent
Andersson et al.

(10) Patent No.: US 11,064,278 B2
(45) Date of Patent: Jul. 13, 2021

(54) AUDIO UNIT ARRANGEMENT AND A CAMERA

(71) Applicant: Axis AB, Lund (SE)

(72) Inventors: Daniel Andersson, Lund (SE); Josef Eid, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/847,664

(22) Filed: Apr. 14, 2020

(65) Prior Publication Data

US 2020/0404404 A1 Dec. 24, 2020

(30) Foreign Application Priority Data

Jun. 20, 2019 (EP) .................................. 19181423

(51) Int. Cl.
 *G03B 29/00* (2021.01)
 *H04R 1/02* (2006.01)
(52) U.S. Cl.
 CPC ............. *H04R 1/028* (2013.01); *G03B 29/00* (2013.01)
(58) Field of Classification Search
 None
 See application file for complete search history.

(56) References Cited

U.S. PATENT DOCUMENTS

| | | | |
|---|---|---|---|
| 5,563,659 A | 10/1996 | Bernhardt et al. | |
| 6,188,773 B1 | 2/2001 | Murata et al. | |
| 9,843,850 B2 | 12/2017 | Worrell | |
| 2005/0162508 A1 | 7/2005 | Basmadjian et al. | |
| 2006/0055820 A1 | 3/2006 | Lyon et al. | |
| 2012/0188690 A1 | 7/2012 | Aihara | |
| 2015/0116590 A1 | 4/2015 | Huang et al. | |
| 2016/0337618 A1* | 11/2016 | Chapman | .................. B68C 1/02 |
| 2017/0010520 A1 | 1/2017 | Tang | |
| 2017/0033797 A1 | 2/2017 | Jung et al. | |
| 2017/0223440 A1* | 8/2017 | Rodrigues | .............. H04R 1/026 |

FOREIGN PATENT DOCUMENTS

| | | |
|---|---|---|
| CN | 202634552 U | 12/2012 |
| EP | 2026496 A1 | 2/2009 |
| EP | 3244604 A1 | 11/2017 |
| KR | 200448216 Y1 | 3/2010 |

OTHER PUBLICATIONS

Communication under Rule 71(3) EPC dated Feb. 17, 2021, in corresponding European patent Application No. 19181423.5, 7 pages.

* cited by examiner

*Primary Examiner* — Duane N Taylor, Jr.
(74) *Attorney, Agent, or Firm* — Xsensus LLP

(57) ABSTRACT

An audio apparatus and a camera including the audio apparatus. The audio apparatus includes an audio transducer electronically connectable to a camera unit, and an audio transducer holder being mechanically connectable to the camera unit and having an audio transducer container being configured to receive the audio transducer and being provided with a spring element allowing the audio transducer to be pushed into the audio transducer container in a first direction and resiliently forcing the audio transducer outward relative to the audio transducer container such that, when the audio apparatus is installed in the camera and the camera is in an assembled state including the removable cover, the audio transducer is forced into abutment against an inside of the removable cover of the camera.

16 Claims, 5 Drawing Sheets

AUDIO UNIT ARRANGEMENT AND A CAMERA

CROSS-REFERENCE TO RELATED APPLICATION

The present application claims priority to EP 19181423.5, filed Jun. 20, 2019, the entire contents of which are incorporated herein by reference.

FIELD OF INVENTION

The invention relates to an audio unit arrangement configured to be installed in a camera.

The invention also relates to a camera comprising a camera unit, a removable cover covering at least a portion of the camera unit, and an audio unit arrangement.

TECHNICAL BACKGROUND

When designing a camera, which for instance may be used as a surveillance camera or the like, and when designing any auxiliary equipment for use with such a camera, the designer typically takes several different design criteria in consideration.

The camera should preferably be easy to attach to a building structure or the like at an intended site of installation and in a desired orientation. The desired orientation may differ depending on the circumstances relating to the intended site of installation of the camera in relation to the building structure and/or in relation to the scene to be monitored. Sometimes the electronic components are encapsulated, such as in an IP-sealed enclosure, i.e. in an enclosure having sealing properties such that it fulfils a certain IP-classification. Sometimes there is a desire to be able to offer an auxiliary equipment as an optional equipment. It is sometimes desirable to deliver such an optional equipment as one or more separate components. Irrespective of the separate component(s) is/are delivered in the same transportation package or in one or more separate transportation packages, the optional equipment should desirably be easy to install in the camera. Such installation of the auxiliary equipment may be performed simultaneously as the camera is assembled and positioned at the intended site of installation. Sometimes it is also desirable to offer an auxiliary or optional equipment as a retro-fit equipment which is configured to be installed in a camera after the camera has been installed at the intended site of installation.

An auxiliary equipment of the kind discussed above may e.g. be an audio unit, such as a speaker or microphone. The desire to provide an audio unit introduces an additional set of design criteria. The audio unit should be installed in the camera in such a way that a desired audio quality may be achieved. Moreover, the audio unit should be installed in the manner in such a way that it has no, or at least minimal, impact on the general design criteria related to the camera as such.

SUMMARY OF INVENTION

It is an object of the invention to provide an audio unit arrangement which is adapted for installation in a camera, such as a digital surveillance camera, which audio unit arrangement addresses at least some of the design criteria relating to the audio unit, such as audio quality and ease of installation, and which has minimal impact on the design criteria relating to the camera, such as for instance allowing the auxiliary equipment to be retro-fitted and to allow the camera to have encapsulated electronics.

This object has been achieved by an audio unit arrangement configured to be installed in a space of a camera, the space being formed between a camera unit and a removable cover of the camera, the audio unit arrangement comprising an audio unit being configured to be electronically connected to the camera unit, and an audio unit holder being configured to be mechanically connected to the camera unit and having an audio unit container being configured to receive the audio unit, wherein the audio unit container is provided with or is configured to receive a spring element, the spring element allowing the audio unit to be pushed into the audio unit container in a first direction due to a resilience of the spring element and thereby resiliently forcing the audio unit in a second direction, opposite the first direction, outward relative to the audio unit container such that, when the audio unit arrangement is installed in the camera and the camera is in an assembled state including the removable cover, the audio unit is forced into abutment against an inside of the removable cover of the camera.

By providing an audio unit being configured to be electronically connected to the camera unit in combination with providing an audio unit holder being configured to be mechanically connected to the camera unit and having an audio unit container being configured to receive the audio unit and being provided with or being configured to receive a spring element, it has been made easy to install an audio unit in a camera and also meet the other criteria, such as audio quality.

It is, e.g., easy to install the audio unit in the audio unit container according to the following. A removable cover of the camera may be removed, whereafter the audio unit may be electronically connected to the camera unit. Thereafter the audio unit holder may be mechanically connected to the camera unit. Thereafter the audio unit may be placed in the audio unit container. Finally the same removable cover or a new removable cover may be reattached to the camera unit such that the audio unit due to a resilience of the spring element is forced in a second direction outward relative to the audio unit container such that, when the audio unit arrangement is installed in the camera and the camera is in an assembled state including the removable cover, the audio unit is forced into abutment against an inside of the removable cover of the camera. This abutment in combination with the force from the spring element provides a distinct mechanical connection between the cover and the audio unit which has a positive impact on the audio quality. This may also be explained as that, as seen along the first direction, the length of the train of components including the spring element in an un-loaded state and the audio unit is slightly larger than a distance between on one hand an interface between then spring element and the audio unit container and on the other hand the inside of the cover when the cover is reattached on the camera. It is desirable that the connection between the cover and the audio unit provides a so-called acoustic sealing reducing any sound-waves leaking between the cover and the audio unit such that any sound-wave in the air is picked up by the audio unit or transmitted from the audio unit to the air with good acoustic quality. Moreover, since the audio unit is forced into abutment against an inside of the removable cover of the camera, it is possible to design the cover and audio unit such that the audio unit is positioned in close proximity to the outside of the cover and thereby also close to the environment. This reduces the risk that the sound quality is impaired, which, e.g., could occur by the sound being distorted due to reflection or other phenomenon occurring as the sound wave is transferred from the environment to the audio unit, or vice versa. It is, e.g., possible to have the cover being designed such that it locally is plate shaped. Thereby, the audio unit will basically only be separated from the environment a distance defined by the material thickness the cover has in the local area where the audio unit is forced against the inside of the removable cover.

The audio unit may be a microphone. The audio unit may be a loud speaker.

It may be noted that the audio unit arrangement comprising an audio unit being configured to be electronically connected to a camera unit, and an audio unit holder being configured to be mechanically connected to the camera unit and having an audio unit container being configured to receive the audio unit, may be provided as a separate kit of parts. This separate kit of parts may be marketed together with the camera in which it is intended to be installed. The separate kit of parts may alternatively be marketed separately from the camera in which it is intended to be installed. The separate kit of parts may be delivered together with the camera in which it is intended to be installed. The separate kit of parts may alternatively be delivered separately from the camera in which it is intended to be installed. Various combination of "together" or "separately" for different parts of the manufacturing process, the marketing, the delivery chain is conceivable. The provision of the audio unit arrangement as a separate kit of parts provides a freedom when setting up the manufacturing process, the marketing and the delivery chain, thereby allowing for a flexible and efficient logistics addressing different situations for different customers, such as the different situation for the customers buying and installing the camera with the audio unit from the beginning compared to the customers wishing to retro-fit an audio unit to an already installed camera.

An outer surface of the audio unit may fit in the audio unit container with an interference fit whereby there may be provided a frictional force between the outer surface of the audio unit and an inwardly facing surface of the audio unit container counteracting movement of the audio unit relative to the audio unit container along the second direction. The interference fit is preferably configured to provide a maximum frictional force as seen along the second direction being smaller than a force by which the spring element forces the audio unit along the second direction when the audio unit arrangement is installed in the camera and the spring element forces the audio unit into abutment against the inside of the cover of the camera. The provision of an interference fit facilitates installation since the friction aids in keeping the audio unit in the audio unit container during the installation process. By balancing the interference fit and the resilience of the spring element in this manner, it is possible to have the audio unit container carrying the audio unit when the audio unit is only pushed to a limited extent into the audio unit container whereas, when the cover is attached, the spring element is compressed somewhat further such that the force due to the resilience increases to a value above the maximum frictional force whereby the audio unit will be forced into a distinct abutment with the inside of the cover. It may be noted that the resilience of the spring element may be balanced by choosing a material and design of the spring element providing a certain spring constant and/or by designing the component such that a certain compression of the spring element is achieved.

The audio unit has a weight and the maximum frictional force may be greater than the weight of the audio unit.

Thereby it is made easy to install the audio unit, since it is possible to insert the audio unit in the audio unit container and the audio unit will thereby be retained in the audio unit container irrespective of the orientation of the audio unit container. This is especially advantageous in cases where the camera is mounted on a ceiling and the audio unit is pushed upwardly into the audio unit container. The installer will thereby not need to hold the audio unit in position in the audio unit container and thereby have both hands free for other manoeuvres necessary to install or reinstall the camera or removable cover. It may also be noted that working with a camera installed on a ceiling often requires the use of a ladder, whereby a design freeing a hand is also advantageous from a safety perspective.

The inwardly facing surface of the audio unit container may be provided with ridges. The ridges may extend inwardly as seen in a cross-section across the first direction, and preferably also extend with a major component along the first direction. By providing ridges, preferably three or more ridges, most preferred four ridges, distributed around the inner circumference of the audio unit container it is possible to provide a well-defined interference fit and thereby also provide a well-defined maximum frictional force. By providing the ridges the impact from small deviations in the dimensions of the components forming the interference fit is reduced compared to having the complete envelope surfaces interacting with each other. It is conceivable that similar ridges are also as a complement, or instead as a substitute, formed on the outer surface of the audio unit. Any ridges on the outer surface of the audio unit would be outwardly extending ridges. Similarly, to the ridges it would be preferred that the ridges on the outer surface also extend along the first direction or at least have a major component along the first direction.

The spring element may be formed of an elastomer. This is a convenient way of providing the desired resilience. Moreover, using a spring element formed of an elastomer also facilitates designing the spring element and the audio unit container such that the spring element is easy to install in the audio unit container and still is capable of being retained in place. The spring element may, e.g., be a disc-shaped or ring-shaped member. The spring element may abut the inwardly facing surface of the audio unit container and frictionally engage with the inwardly facing surface of the audio unit container such that it is kept in placed during handling of the audio unit holder.

A wall of the audio unit container may be provided with recess allowing an electrical wire connected to the audio unit to exit the audio unit container. This facilitates installation since it allows for the audio unit to be integrally formed with the electrical wire and still allows the electrical wire to exit the audio unit container. Preferably, the recess is formed such that it extends through the wall and is connected to an edge of the wall forming a mouth through which the audio unit is inserted into the audio unit container.

The audio unit container may be provided with at least one through-going slit extending along the first direction providing access to an outer surface of the audio unit positioned inside the audio unit container. This facilitates intentional removal, without significantly increasing the risk of unintentional removal, of the audio unit from the audio unit container. The through-going slit may, but need not, be the same as the recess allowing the electrical wire to exit the audio unit container. Thus, it is conceivable to have a separate recess and a separate slit. It is also conceivable to have more than one recesses distributed around the circumference of the audio unit container thereby allowing different orientations of a specific audio unit or allowing different variants of audio units to be inserted in the audio unit container. It is also conceivable to have more than one slit distributed around the circumference of the audio unit container, such as two opposing slits. In such conceivable configurations with one or more recesses and one or more slits it is conceivable that all the recesses also double as slits or vice versa. It is also conceivable that some, but not all, recesses also double as slits or vice versa.

It may be noted that a suitable extension of a recess along the first direction, as measured from the mouth of the recess, is typically determined by where the electrical wire is attached to the audio unit. The recess should preferably extend slightly past the attachment point such that the electrical wire may extend out of or exit the audio unit container without being subjected to any tension or folding.

It may be noted that a suitable extension of a slit along the first direction, as measured from the mouth, is typically determined by the height or extension of the audio unit along the first direction. The slit should preferably at least extend a distance sufficient to get a distinct grip of the audio unit from the sides. In a preferred embodiment, the slit extends past the audio unit. Thereby, it is possible to exert any force for removal of the audio unit on a bottom surface of the audio unit. In a preferred embodiment, the slit extends past the audio unit and also exposes at least a portion of the, preferably the complete, height or extension of the spring element along the first direction, such that intentional removal of the spring element is facilitated.

The audio unit may comprise a flexible cap. The flexible cap is preferably being formed of an elastomer. The flexible cap may be used to provide a distinct connection between the cover and the audio unit. The flexible cap may also facilitate in the desired provision of a so-called acoustic sealing between the audio unit and the cover.

The flexible cap may have a top surface and may be arranged on the audio unit such that the top surface of the flexible cap forms at least part, and preferably all, of an abutment surface of the audio unit abutting the inside of the cover when the audio unit is forced into abutment against the inside of the cover of the camera. This may further facilitate the desired provision of a so-called acoustic sealing between the audio unit and the cover.

The flexible cap may have an envelope surface extending along the first direction and forming part of the interference fit between the audio unit and the audio unit container. This may facilitate the provision of a well-defined interference fit providing the desired friction force but still making it easy for the spring element to overcome the friction force when the cover is reattached to the camera.

The audio unit and the audio unit holder may be arranged outside a sealed enclosure enclosing the camera unit and wherein there is provided a sealed through-going cable channel in the sealed enclosure allowing passage of an electrical wire extending from the audio unit into the camera unit inside the enclosure. With this design is it possible to have the audio unit positioned in a manner being optimal for the sound quality, whereas the enclosure is not negatively affected to any large extent. A through-going cable channel may, e.g., be provided in an interface between two components forming the enclosure such that closing of the enclosure also closes the trough-going cable channel.

The kit of parts including the audio unit arrangement may also further comprise the removable cover. The removable cover is preferably being provided with an opening being positioned relative to a position of the audio unit such that the opening coincides with the audio unit. If the camera has been marketed without the audio unit, the cover originally attached to the camera is most often not provided with any openings. Thus, in many cases, it is desirable to provide a replacement cover being provided with an opening which coincides with the audio unit. The provision of the opening allows sound waves to pass through the cover to or from the audio unit.

The removable cover may be provided with an abutment surface circumscribing the opening and wherein the audio unit may be provided with an abutment surface configured to abut the abutment surface of the removable cover whereby an acoustic sealing may be formed around the opening.

The above-mentioned objective has also been achieved by a camera comprising
 a camera unit,
 a removable cover covering at least a portion of the camera unit, and
 an audio unit arrangement according to any of the embodiments discussed above, the audio unit arrangement being installed in a space formed between the camera unit and the removable cover such that the audio unit is forced by the spring element into abutment against an inside of the cover.

The above-mentioned objective has also been achieved by a camera comprising
 a camera unit,
 a removable cover covering at least a portion of the camera unit, and
 an audio unit arrangement installed in a space formed between the camera unit and the removable cover, wherein the audio unit comprises
  an audio unit electronically connected to the camera unit, and
  an audio unit holder mechanically connected to the camera unit and having an audio unit container in which the audio unit is received,
  the audio unit container comprising a spring element allowing the audio unit to be pushed into the audio unit container in a first direction due to a resilience of the spring element and the spring element thereby resiliently forcing the audio unit in a second direction, opposite the first direction, outward relative to the audio unit container such that the audio unit is forced into abutment against an inside of the removable cover.

We have in the above, with reference to the audio unit arrangement configured to be installed in a camera, in detail discussed various preferred embodiments and advantages associated thereto. It may be noted that the various preferred embodiments and advantages associated thereto are equally applicable to a camera with such an audio unit arrangement installed in a space between a camera unit and a cover and reference is therefore made to the above discussion concerning the various preferred embodiments and advantages associated thereto.

The removable cover may be provided with an opening being positioned relative to a position of the audio unit such that the opening coincides with the audio unit. The removable cover may be provided with an abutment surface circumscribing the opening. The audio unit may be provided with an abutment surface configured to abut the removable cover, and preferably abut an abutment surface of the removable cover, whereby an acoustic sealing is formed around the opening.

The invention may also in short be said to relate to an audio unit arrangement and a camera comprising such an audio unit arrangement, wherein the audio unit arrangement comprises an audio unit electronically connectable to a camera unit, and an audio unit holder being mechanically connectable to the camera unit and having an audio unit container being configured to receive the audio unit and being provided with a spring element allowing the audio unit to be pushed into the audio unit container in a first direction and resiliently forcing the audio unit outward relative to the audio unit container such that, when the audio unit arrangement is installed in the camera and the camera is in an assembled state including the removable cover, the audio unit is forced into abutment against an inside of the removable cover of the camera.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

Figure 1:
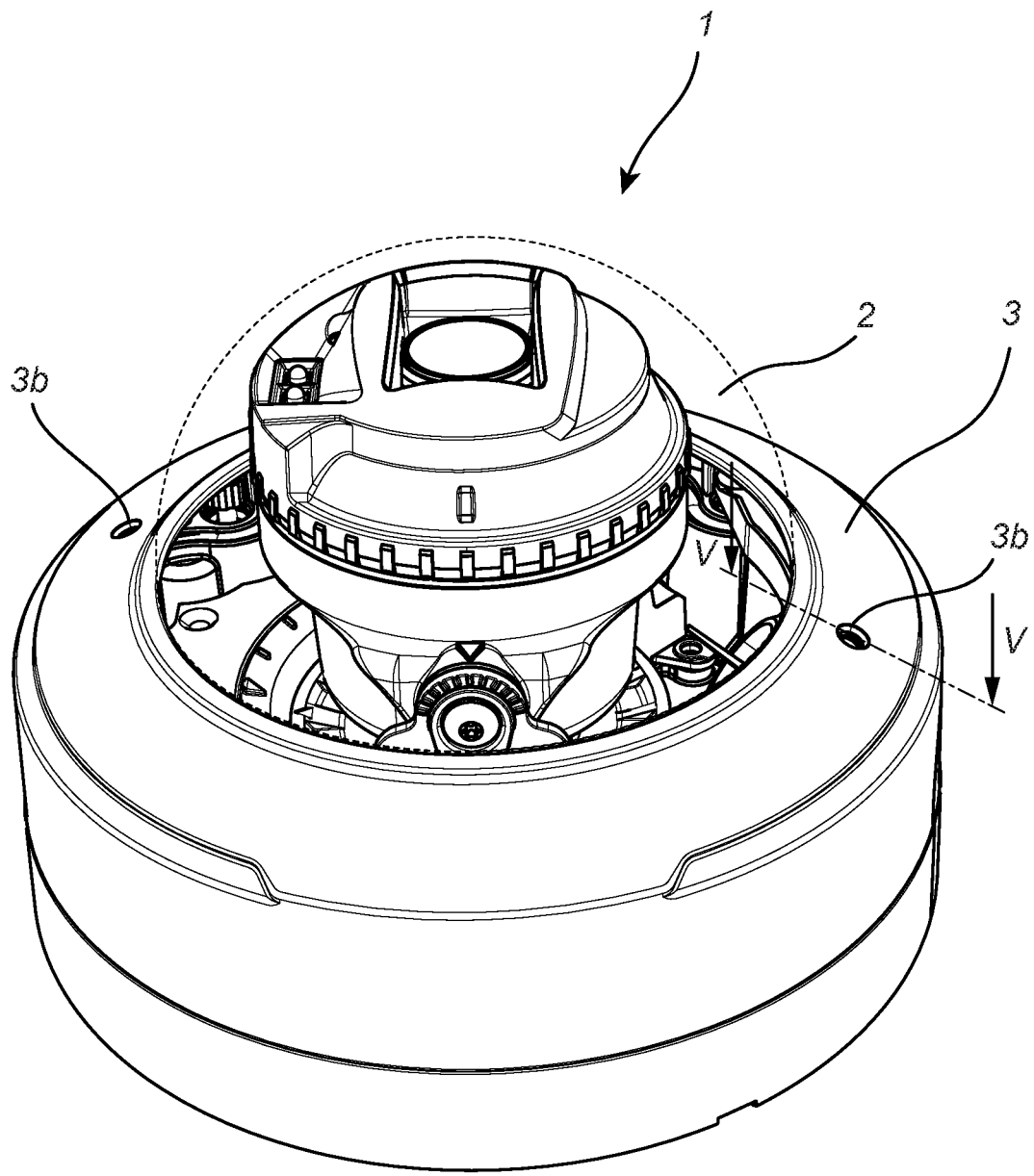
FIG. 1 discloses a camera.
Figure 2:
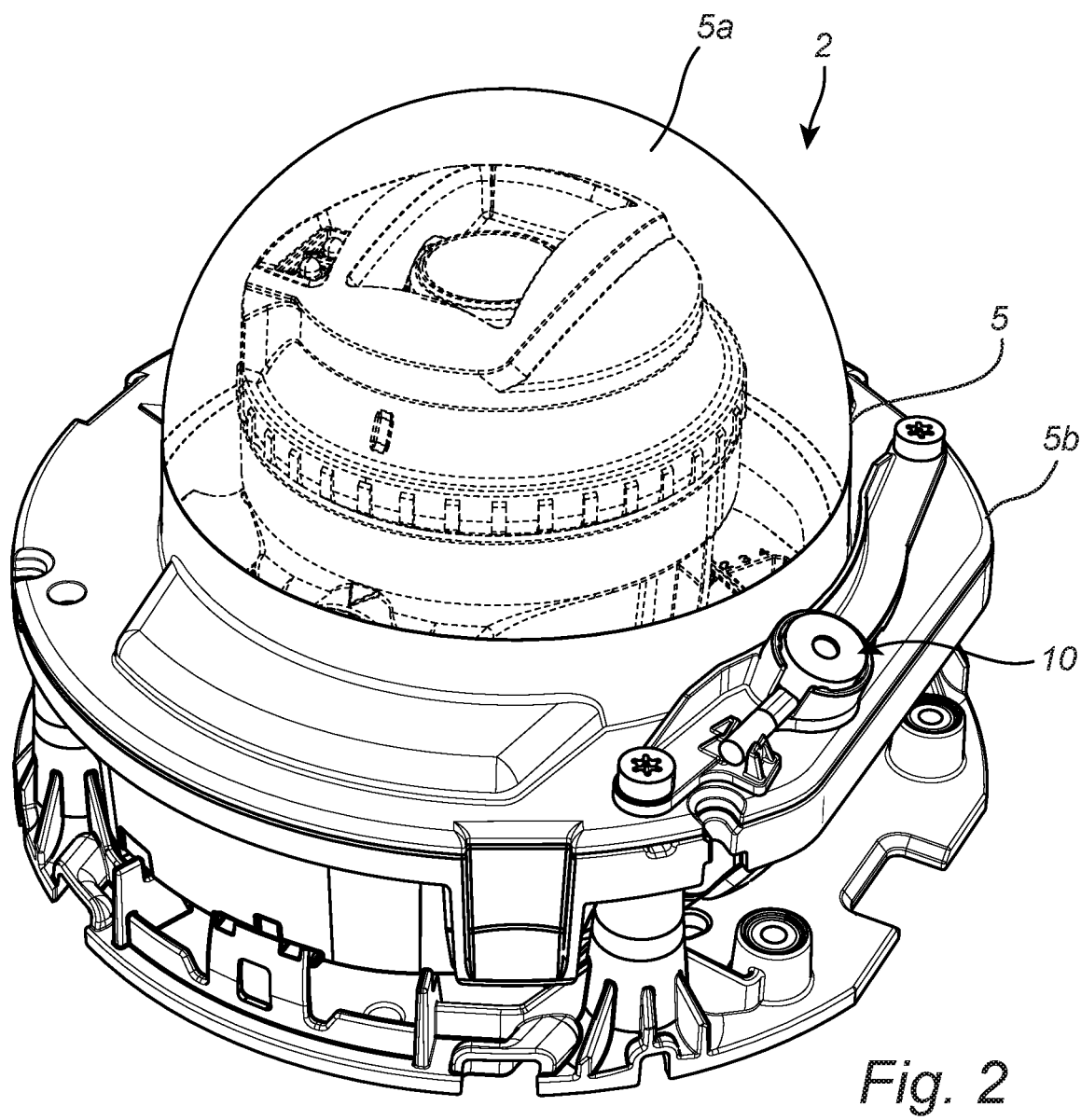
FIG. 2 discloses the camera of FIG. 1 with a removable cover removed thereby disclosing an audio unit arrangement.
Figure 5:
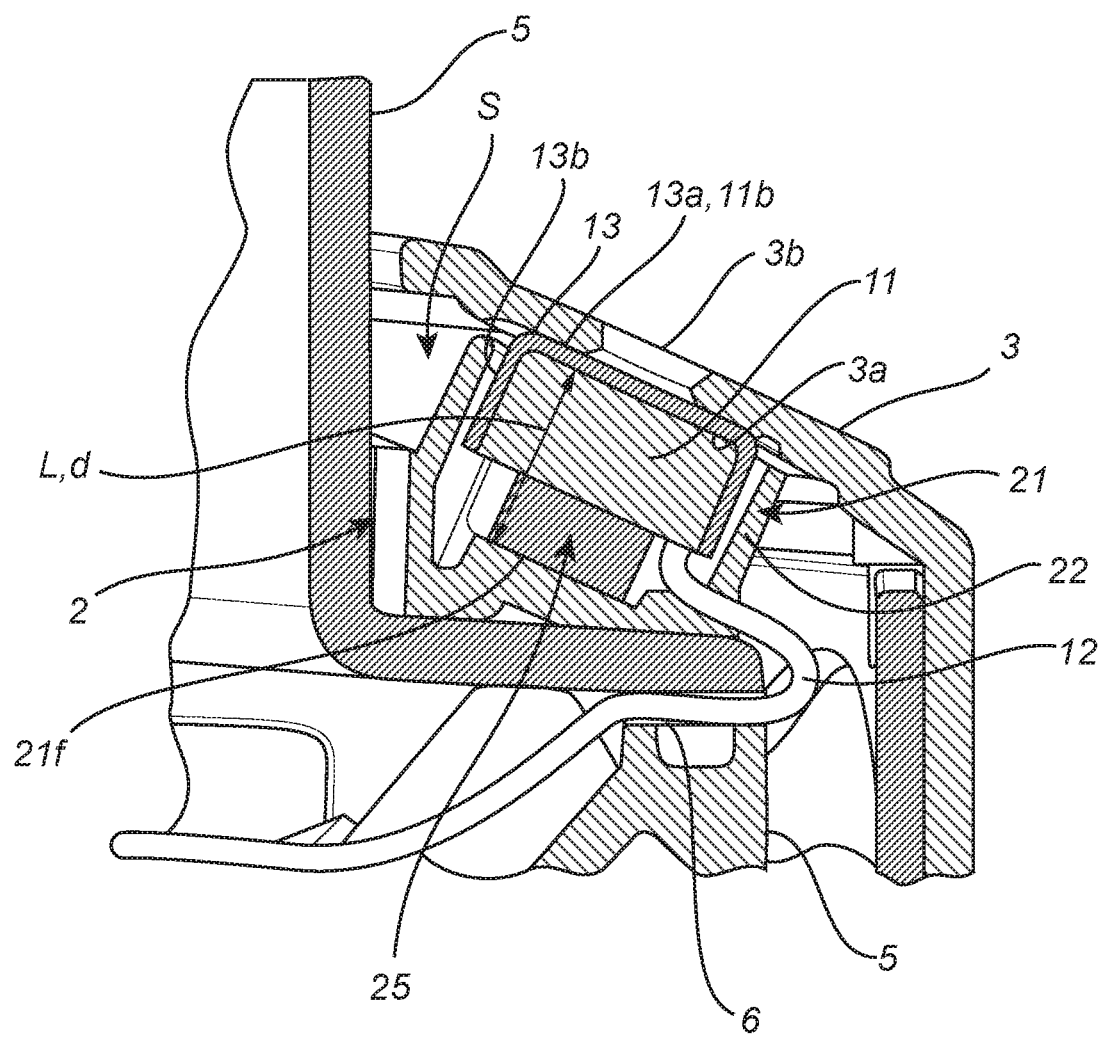
FIG. 5 is a cross-sectional view along line V-V in FIG. 1.

With reference to FIG. 1, there is disclosed a camera 1 comprising a camera unit 2 and a cover 3. As shown in FIGS. 2 and 5, there is an audio unit arrangement 10 installed in a space S of the camera 1. The space S is formed between the camera unit 2 and the removable cover 3.

Figure 4:
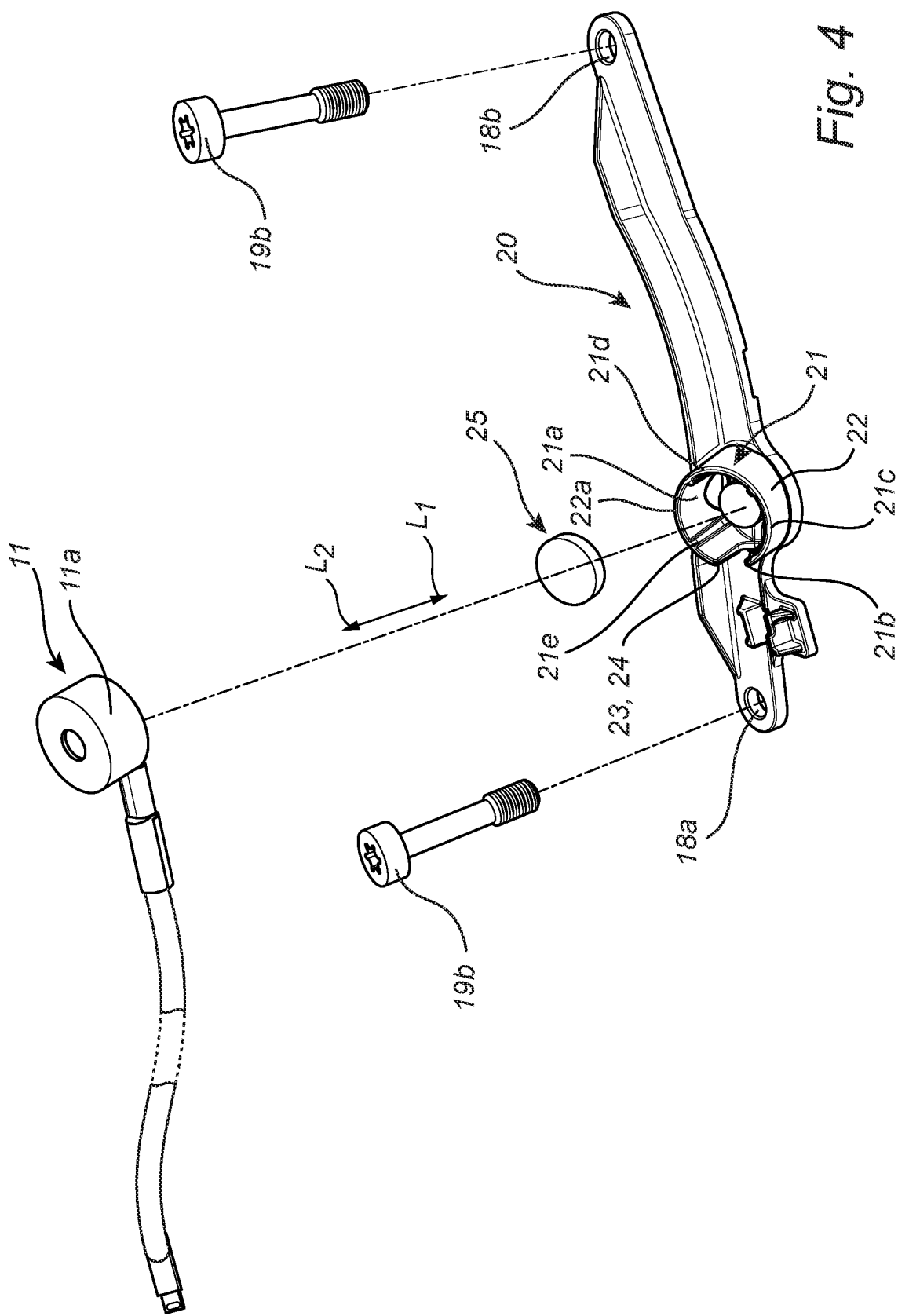
FIG. 4 is an exploded view of the audio unit arrangement.

As shown in FIG. 4, the audio unit arrangement 10 comprises an audio unit 11 and an audio unit holder 20. The audio unit 11 is configured to be electronically connected to the camera unit 2. The audio unit holder 20 is configured to be mechanically connected to the camera unit 2. The audio unit holder 20 has an audio unit container 21. The audio unit container 21 is configured to receive the audio unit 11.

As shown in FIGS. 4 and 5, the audio unit container 21 may be provided with or may be configured to receive a spring element 25. The spring element 25 is configured to allow the audio unit 11 to be pushed into the audio unit container 21 in a first direction L1 due to a resilience of the spring element 25 and thereby resiliently force the audio unit 11 in a second direction L2, opposite the first direction L1, outward relative to the audio unit container 21. The spring element 25 is configured to force the audio unit 11 outwardly such that, when the audio unit arrangement 10 is installed in the camera 1 and the camera 1 is in an assembled state including the removable cover 3, the audio unit 11 is forced into abutment against an inside 3a of the removable cover 3 of the camera 1.

The audio unit 11 may be installed in the camera 1 according to the following: a removable cover 3 of the camera 1 may be removed, whereafter the audio unit 11 may be electronically connected to the camera unit 2, whereafter the audio unit holder 20 may be mechanically connected to the camera unit 2, whereafter the audio unit 11 may be placed in the audio unit container 21, and whereafter finally the same removable cover 3 or another removable cover 3 may be reattached to the camera unit 2 such that the audio unit 11 due to a resilience of the spring element 25 is forced in a second direction L2 outward relative to the audio unit container 21 such that, when the audio unit arrangement 10 is installed in the camera 1 and the camera 1 is in an assembled state including the removable cover 3, the audio unit 11 is forced into abutment against an inside 3a of the removable cover 3 of the camera 1.

As shown in FIG. 5, the length L of the train of components including the spring element 25 in an un-loaded state and the audio unit 11 is preferably slightly larger than a distance between on one hand an interface 21f between then spring element 25 and the audio unit container 21 and on the other hand the inside 3a of the cover 3 when the cover 3 is reattached on the camera 1. In FIG. 5, the spring element 25 is in a loaded state such that the length L is reduced such that it becomes equal to the distance d.

It is desirable that the connection between the cover 3 and the audio unit 11 provides a so-called acoustic sealing reducing any sound-waves leaking between the cover 3 and the audio unit 11 such that any sound-wave in the air is picked up by the audio unit 11 or transmitted from the audio unit 11 to the air with good acoustic quality.

The audio unit 11 may be a microphone. The audio unit 11 may be a loud speaker.

An outer surface 11a of the audio unit 11 may fit in the audio unit container 21 with an interference fit whereby there may be provided a frictional force between the outer surface 11a of the audio unit 11 and an inwardly facing surface 21a of the audio unit container 21 counteracting movement of the audio unit 11 relative to the audio unit container 21 along the second direction L2. The interference fit is preferably configured to provide a maximum frictional force as seen along the second direction L2 being smaller than a force by which the spring element 25 forces the audio unit 11 along the second direction L2 when the audio unit arrangement 10 is installed in the camera 1 and the spring element 25 forces the audio unit 11 into abutment against the inside 3a of the cover 3 of the camera 1.

The audio unit 11 has a weight and the maximum frictional force may be greater than the weight of the audio unit 11. Preferably, the maximum frictional force is sufficient to also take into account the weight of the wire 12 and any connector 12b by which the electrical wire 12 is connected to the camera unit 2.

The inwardly facing surface 21a of the audio unit container 21 may be provided with ridges 21b-e, preferably a plurality of ridges 21b-e distributed around the inner circumference of the audio unit container 21. The ridges 21b-e may extend inwardly as seen in a cross-section across the first direction L1. It is preferred that the ridges 21b-e extend with a major component along the first direction L1. In the preferred embodiment shown in the figures, the ridges 21b-e extend along the first direction L1. As shown, e.g., in FIG. 4, there are in the preferred embodiment four ridges 21b-e distributed around the inner circumference of the audio unit container 21.

The spring element 25 may be formed of an elastomer. Non-limiting examples of suitable elastomer materials are polyurethane and silicon. The spring element 25 may e.g. be made of a microcellular polyurethane marketed under the trademark Poron. The spring element 25 may, e.g., be a disc-shaped or ring-shaped member. The spring element 25 may abut the inwardly facing surface 21a of the audio unit container 21 and frictionally engage with the inwardly facing surface 21a of the audio unit container 21 such that it is kept in placed during handling of the audio unit holder 20.

A wall 22 of the audio unit container 21 may be provided with recess 23 allowing an electrical wire 12 connected to the audio unit 11 to exit the audio unit container 21. Preferably, the recess 23 is, as shown in FIG. 4, formed such that it extends through the wall 22 and is connected to an edge 22*a* of the wall 22 forming a mouth 22*b* through which the audio unit 11 is inserted into the audio unit container 21.

As, e.g., shown in FIG. 4, the recess 23 in the wall 22 of the audio unit container 21 may also act as a through-going slit 24 extending along the first direction L1 providing access to an outer surface 11*a* of the audio unit 11 positioned inside the audio unit container 21.

It may be noted that a suitable extension of a recess 23 along the first direction L1, as measured from the mouth 22*b*, is typically determined by where the electrical wire 12 is attached to the audio unit 11. The recess 23 should preferably extend slightly past such an attachment point such that the electrical wire 12 may extend out of or exit the audio unit container 21 without being subjected to any tension or folding.

It may be noted that a suitable extension of a slit 24 along the first direction L1, as measured from the mouth 22*b*, it typically determined by the height or extension of the audio unit 11 along the first direction L1. The slit 24 should preferably at least extend a distance sufficient to allow getting a distinct grip of the audio unit 11 from the sides. In a preferred embodiment, the slit 24 extends past the audio unit 11. Thereby, it is possible to exert any force for removal of the audio unit 11 on a bottom surface of the audio unit 11. In a preferred embodiment, the slit 24 extends past the audio unit 11 and also exposes at least a portion of the, preferably the complete, height or extension of the spring element 25 along the first direction L1, such that intentional removal of the spring element 25 is facilitated.

As, e.g., shown in FIG. 5, the audio unit 11 may comprise a flexible cap 13. The flexible cap 13 is preferably being formed of an elastomer. The flexible cap 13 may be used to provide a distinct connection between the cover 3 and the audio unit 11. The flexible cap 13 may also facilitate in the desired provision of a so-called acoustic sealing between the audio unit 11 and the cover 3.

The flexible cap 13 may have a top surface 13*a* and may be arranged on the audio unit 11 such that the top surface 13*a* of the flexible cap 13 forms at least part, and preferably all, of an abutment surface 11*b* of the audio unit 11 abutting the inside 3*a* of the cover 3 when the audio unit 11 is forced into abutment against the inside 3*a* of the cover 3 of the camera 1. This may further facilitate the desired provision of a so-called acoustic sealing between the audio unit 11 and the cover 3.

The flexible cap 13 may have an envelope surface 13*b* extending along the first direction L1 and forming part of the interference fit between the audio unit 11 and the audio unit container 21. This may facilitate the provision of a well-defined interference fit providing the desired friction force but still making it easy for the spring element 25 to overcome the friction force when the cover 3 is reattached to the camera 1.

As, e.g., shown in FIGS. 2 and 5, the audio unit 11 and the audio unit holder 20 may be arranged outside a sealed enclosure 5 enclosing the camera unit 2. In such a case there may be provided a sealed through-going cable channel 6 in the sealed enclosure 5 allowing passage of an electrical wire 12 extending from the audio unit 11 into the camera unit 2 inside the enclosure 5. The through-going cable channel 6 may, as shown in FIG. 5, be provided in an interface between two components forming the enclosure 5 such that closing of the enclosure 5 also closes the trough-going cable channel 6.

Figure 3:
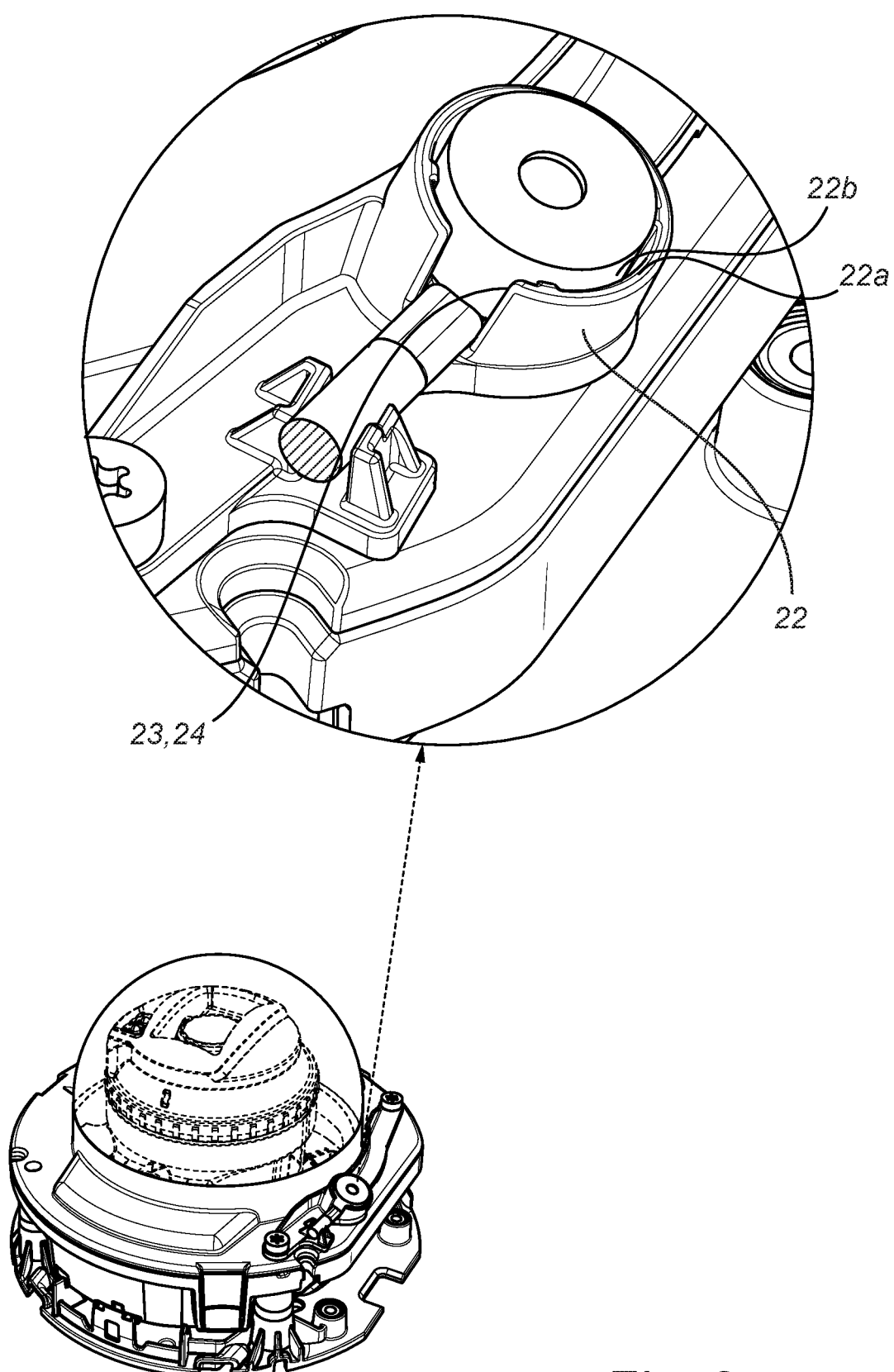
FIG. 3 is a partial enlargement of the audio unit arrangement and parts of the camera.

As shown in FIGS. 2-4, the audio unit holder 10 is mechanically connected to an outside of the enclosure 5. The audio unit holder 10 has two through-going holes 18*a-b*. The through-going holes 18*a-b* are each configured to receive a screw 19*a*, respectively 19*b*, threaded into a threaded hole of the camera unit 2. The screws 19*a-b* are provided with heads abutting the audio unit holder 10 and thereby forcing the audio unit holder 10 into abutment with the camera unit 2. In the disclosed embodiment, the audio unit holder 10 is forced into abutment with the enclosure 5 of the camera unit 2. The threaded holes in the camera unit 2 are in the preferred embodiment the same threaded holes also used to tighten an upper dome 5*a* of the enclosure 5 to the bottom part 5*b* of the enclosure 5. However, it is also conceivable that there are provided additional threaded holes for the attachment of the audio unit holder 10. The screws 19*a-b* are preferably designed as non-fall-out screws 19*a-b*. This may e.g. be provided by designing the screws 19*a-b* with a waist portion configured to extend through the through-going holes 18*a-b* in combination with providing threads or the like in the through-going holes 18*a-b* which the threaded portion of each screw 19*a-b* does not easily pass through.

The kit of parts including the audio unit arrangement 10 may also further comprise the removable cover 3. The removable cover 3 is preferably being provided with an opening 3*b* being positioned relative to a position of the audio unit 11 such that the opening 3*b* coincides with the audio unit 11. If the camera 1 has been marketed without the audio unit 11, the cover originally attached to the camera 1 is most often not provided with any openings. Thus, in many cases, it is desirable to provide a replacement cover 3 being provided with an opening 3*b* which coincides with the audio unit 11. The provision of the opening 3*b* allows sound waves to pass through the cover 3 to or from the audio unit 11.

The removable cover 3 may be provided with an abutment surface 3*c* circumscribing the opening 3*b* and wherein the audio unit 11 may be provided with an abutment surface 11*b* configured to abut the abutment surface 3*c* of the removable cover 3 whereby an acoustic sealing may be formed around the opening 3*b*.

It may be noted that the cover 3 shown in FIG. 1 is provided with two openings 3*b* being positioned opposite to each other about the circumference of the cover 3. It may also be noted that the audio unit holder 10 may be attached using the screws 19*a-b* in other orientations relative to the bottom part 5*b*. The camera unit 2 and/or the enclosure 5 is often attached to the bottom part 5*b* using a plurality of screws in screw holes distributed around the camera unit 2. The screws and screw holes are typically distributed and positioned relative to each other such that the camera unit 2 and/or enclosure 5 may be attached to the bottom part 5*b* in more than one orientation or rotational position. Orientation or rotational position is in this context denoted as a rotation of the camera unit 2 and/or enclosure 5 about an optical axis of the camera unit 2 relative to the bottom part 5*b*. By attaching the audio unit holder 10 with screws 19*a-b* being screwed into these screw holes, it becomes possible to attach the audio unit holder 10 in different orientations.

It is, e.g., conceivable to re-orient the dome 5*a* 180° relative to the bottom part 5*b*. By providing the cover 3 with two openings 3*b*, it is possible to install the cover 3 in two orientations being rotated 180° relative to each other. It is also conceivable to allow for other orientations, such as 90° and 270°, relative to an original orientation of the cover 3.

By allowing the audio unit holder 10 to be installed in different orientations and by providing the cover 3 with a plurality of openings 3b, it is possible to take into account a number of different aspects when assembling the camera 1. The camera unit 2 and the cover 3 may be installed in their desired configuration relative to each other and the audio unit 11 may be positioned such that it makes use of the most appropriate opening 3b of the plurality of openings available in the cover 3. The camera unit 2 and the cover 3 may, e.g., be installed to provide the desired viewing angle for the camera unit 2 and to allow for convenient wiring of power and network cable. However, by providing a plurality of openings 3b and by allowing the audio unit holder 10 to be installed in a plurality of orientations, there is still typically more than one possible orientation available for the installation of the audio unit holder 10 and thereby the audio unit 11 may be oriented such that it, e.g., is directed away from a nearby wall and/or directed towards a direction from which sound is expected to originate.

Even though it is preferred that the audio unit arrangement 10 and the camera 1 are designed in accordance with the disclosure in the detailed disclosure of preferred embodiments and the appended drawings, it should be noted that a specific preferred embodiment of a specific component does not necessarily have to be combined with a specific embodiment of another component. Thus, advantages associated with a specific embodiment, including one or more features, of a specific component may be accomplished even though the other components are designed in accordance with the more general disclosure, such as a disclosure under the summary of the invention, rather than being defined in accordance with the specific embodiment disclosed in the detailed description.

The audio unit 11 may, as an example, be designed with the flexible cap 13, which may include the top surface 13a and optionally also include the envelope surface 13b, whereas the audio unit container 21 does not necessarily need to include the ridges 21b-e, and especially not ridges 21b-e designed as shown in the figures, or vice versa in a sense that there might be ridges 21b-e, and optionally ridges 21b-e of the kind disclosed in the detailed description, but that there need not necessarily be a cap 13 and especially not necessarily a cap 13 as disclosed in detail in the detailed description.

It is contemplated that there are numerous modifications of the embodiments described herein, which are still within the scope of the invention as defined by the appended claims.

It is, e.g., conceivable that similar ridges are also as a complement, or instead as a substitute, formed on the outer surface 11a of the audio unit 11. Any ridges on the outer surface 11a of the audio unit 11 would be outwardly extending ridges. Similarly, to the ridges 21a-e it would be preferred that the ridges on the outer surface 11a also extend along the first direction L1 or at least have a major component along the first direction L1.

As shown in the figures and as discussed above, the through-going slit 24 which extends along the first direction L1 and which provides access to an outer surface 11a of the audio unit 11 positioned inside the audio unit container 21 may be the same as the recess 23 allowing the electrical wire 12 to exit the audio unit container 21. However, it should be noted that the recess 23 and the slit 24 do not need to be the same. Thus, it is conceivable to have a separate recess 23 and a separate slit 24.

It is also conceivable to have more than one recess 23 distributed around the circumference of the audio unit container 21 thereby allowing different orientations of a specific audio unit 11 or allowing different variants of audio units 11 to be inserted in the audio unit container 21. It is also conceivable to have more than one slit 24 distributed around the circumference of the audio unit container 21, such as two opposing slits 24. In such conceivable configurations with one or more recesses 23 and one or more slits 24 it is conceivable that all the recesses 23 also double as slits 24 or vice versa. It is also conceivable that some, but not all, recesses 23 also double as slits 24 or vice versa.

It may also be noted that a recess 23 may have a wider cross-section than a slit 24 such that the wider recess 23 is formed close to the mouth 22b and that the recess 23 is continued, as seen along the first direction L1, in the form of a narrower slit 24.

The invention claimed is:

1. An audio apparatus configured to be installed in a space (S) of a camera, the space (S) being formed between a camera assembly and a removable cover of the camera, the audio apparatus comprising:
   an audio transducer configured to be electronically connected to the camera assembly, and
   an audio transducer holder being configured to be mechanically connected to the camera assembly and having an audio transducer container configured to receive the audio transducer,
   wherein the audio transducer container is provided with or is configured to receive a spring element that allows the audio transducer to be pushed into the audio transducer container in a first direction (L1) against a resilience of the spring element so as to resiliently force the audio transducer in a second direction (L2), opposite the first direction (L1), outward relative to the audio transducer container such that, when the audio apparatus is installed in the camera and the camera is in an assembled state including the removable cover, the audio transducer is forced into abutment against an inside of the removable cover of the camera.

2. The audio apparatus according to claim 1, wherein an outer surface of the audio transducer fits in the audio transducer container with an interference fit providing a frictional force between the outer surface of the audio transducer and an inwardly facing surface of the audio transducer container counteracting movement of the audio transducer relative to the audio transducer container along the second direction (L2), wherein the interference fit is configured to provide a maximum frictional force as seen along the second direction (L2) being smaller than a force by which the spring element forces the audio transducer along the second direction (L2) when the audio apparatus is installed in the camera and the spring element forces the audio transducer into abutment against the inside of the cover of the camera.

3. The audio apparatus according to claim 2, wherein the audio transducer has a weight and the maximum frictional force is greater than the weight of the audio transducer.

4. The audio apparatus according to claim 2, wherein the inwardly facing surface of the audio transducer container is provided with ridges, the ridges extending inwardly as seen in a cross-section across the first direction (L1), and preferably also extending with a major component along the first direction (L1).

5. The audio apparatus according to claim 1, wherein the spring element is formed of an elastomer.

6. The audio apparatus according to claim 1, wherein a wall of the audio transducer container is provided with a recess that allows an electrical wire connected to the audio transducer to exit the audio transducer container.

7. The audio apparatus according to claim 1, wherein the audio transducer container is provided with at least one through-going slit extending along the first direction (L1) providing access to an outer surface of the audio transducer positioned inside the audio transducer container.

8. The audio apparatus according to claim 1, wherein the audio transducer comprises a flexible cap.

9. The audio apparatus according to claim 8, wherein the flexible cap being formed of an elastomer.

10. The audio apparatus according to claim 9, wherein the flexible cap has a top surface and is arranged on the audio transducer such that the top surface of the flexible cap forms at least part of an abutment surface of the audio transducer abutting the inside of the cover when the audio transducer is forced into abutment against the inside of the cover of the camera.

11. The audio apparatus according to claim 9,
wherein an outer surface of the audio transducer fits in the audio transducer container with an interference fit providing a frictional force between the outer surface of the audio transducer and an inwardly facing surface of the audio transducer container counteracting movement of the audio transducer relative to the audio transducer container along the second direction (L2), wherein the interference fit is configured to provide a maximum frictional force as seen along the second direction (L2) being smaller than a force by which the spring element forces the audio transducer along the second direction (L2) when the audio apparatus is installed in the camera and the spring element forces the audio transducer into abutment against the inside of the cover of the camera, and
wherein the flexible cap has an envelope surface extending along the first direction (L1) and forming part of the interference fit between the audio transducer and the audio transducer container.

12. The audio apparatus according to claim 1, wherein the audio transducer and the audio transducer holder are arranged outside a sealed enclosure enclosing the camera assembly and wherein there is provided a sealed through-going cable channel in the sealed enclosure allowing passage of an electrical wire extending from the audio transducer into the camera assembly inside the enclosure.

13. The audio apparatus according to claim 1, further comprising the removable cover, the removable cover being provided with an opening being positioned relative to a position of the audio transducer such that the opening coincides with the audio transducer.

14. The audio apparatus according to claim 13, wherein the removable cover is provided with an abutment surface circumscribing the opening and wherein the audio transducer is provided with an abutment surface configured to abut the abutment surface of the removable cover whereby an acoustic sealing is formed around the opening.

15. A camera comprising
a camera assembly,
a removable cover covering at least a portion of the camera assembly, and
an audio apparatus according to claim 1 installed in a space (S) formed between the camera assembly and the removable cover such that the audio transducer is forced by the spring element into abutment against art inside of the cover.

16. The camera according to claim 15, wherein the removable cover is provided with an opening being positioned relative to a position of the audio transducer such that the opening coincides with the audio transducer, wherein the removable cover preferably is provided with an abutment surface circumscribing the opening and wherein the audio transducer preferably is provided with an abutment surface configured to abut the abutment surface of the removable cover whereby an acoustic sealing is formed around the opening.

* * * * *